US009310905B2

(12) United States Patent
Luo

(10) Patent No.: US 9,310,905 B2
(45) Date of Patent: Apr. 12, 2016

(54) DETACHABLE BACK MOUNTED TOUCHPAD FOR A HANDHELD COMPUTERIZED DEVICE

(75) Inventor: Tong Luo, Fremont, CA (US)

(73) Assignee: Handscape Inc., Fremont, CA (US)

( * ) Notice: Subject to any disclaimer, the term of this patent is extended or adjusted under 35 U.S.C. 154(b) by 0 days.

(21) Appl. No.: 13/223,836

(22) Filed: Sep. 1, 2011

(65) Prior Publication Data

US 2012/0007822 A1   Jan. 12, 2012

Related U.S. Application Data

(63) Continuation-in-part of application No. 12/773,075, filed on May 4, 2010, now Pat. No. 8,384,683.

(60) Provisional application No. 61/327,102, filed on Apr. 23, 2010.

(51) Int. Cl.
  *G06F 3/041*   (2006.01)
  *G06F 3/0354*  (2013.01)
  *G06F 1/16*    (2006.01)

(52) U.S. Cl.
  CPC .............. *G06F 3/041* (2013.01); *G06F 1/1632* (2013.01); *G06F 3/03547* (2013.01); *G06F 1/1626* (2013.01)

(58) Field of Classification Search
  USPC .......................... 345/158, 173; 715/701, 702
  See application file for complete search history.

(56) References Cited

U.S. PATENT DOCUMENTS

| | | | |
|---|---|---|---|
| 5,530,234 A  * | 6/1996  | Loh et al. ................. 235/61 R |
| 6,239,790 B1   | 5/2001  | Martinelli et al. |
| 6,297,752 B1 * | 10/2001 | Ni ............................. 341/22 |
| 6,512,511 B2 * | 1/2003  | Willner et al. ............. 345/169 |
| 6,628,511 B2 * | 9/2003  | Engstrom .................. 361/679.56 |
| 7,667,692 B2 * | 2/2010  | Marcus et al. ............. 345/169 |
| 7,705,799 B2 * | 4/2010  | Niwa ......................... 345/1.1 |
| 7,724,157 B1 * | 5/2010  | Gray .......................... 341/22 |
| 7,864,164 B2   | 1/2011  | Cunningham et al. |
| 7,881,055 B2 * | 2/2011  | Brandenberg et al. ..... 361/679.3 |
| 8,289,702 B2 * | 10/2012 | Karwan .................... 361/679.55 |
| 8,384,683 B2   | 2/2013  | Luo |
| 8,390,573 B2 * | 3/2013  | Trout ........................ 345/169 |
| 2002/0118175 A1 * | 8/2002  | Liebenow et al. ......... 345/168 |
| 2002/0180767 A1 * | 12/2002 | Northway et al. ......... 345/698 |
| 2003/0048205 A1  | 3/2003  | He |
| 2004/0032398 A1  | 2/2004  | Ariel et al. |
| 2004/0046744 A1  | 3/2004  | Rafii et al. |
| 2004/0097256 A1 * | 5/2004  | Kujawski .................. 455/550.1 |
| 2005/0176461 A1 * | 8/2005  | Bozzone et al. ........... 455/551 |
| 2006/0007178 A1  | 1/2006  | Davis |
| 2006/0114233 A1  | 6/2006  | Radivojevic et al. |

(Continued)

OTHER PUBLICATIONS

Office Action for Chinese Patent Application No. 201110113001.3 mailed Jan. 6, 2014 (English translation).

(Continued)

*Primary Examiner* — Calvin C Ma
(74) *Attorney, Agent, or Firm* — Stephen E. Zweig

(57) ABSTRACT

The present invention relates to a detachable touchpad for a handheld computerized device. This detachable touchpad is configured to reversibly attach to the back of a handheld computerized device that lacks a rear mounted touchpad, and with appropriate software, allow the user to at least in part control the handheld computerized device from behind the device.

17 Claims, 7 Drawing Sheets

(56) References Cited

U.S. PATENT DOCUMENTS

| | | | |
|---|---|---|---|
| 2007/0247800 A1* | 10/2007 | Smith et al. | 361/683 |
| 2007/0262965 A1 | 11/2007 | Hirai et al. | |
| 2007/0268261 A1* | 11/2007 | Lipson | 345/169 |
| 2008/0084397 A1 | 4/2008 | On et al. | |
| 2008/0096620 A1* | 4/2008 | Lee et al. | 455/575.8 |
| 2008/0211766 A1 | 9/2008 | Westerman et al. | |
| 2008/0285857 A1 | 11/2008 | Sharan et al. | |
| 2009/0009951 A1* | 1/2009 | Sbaiti | 361/683 |
| 2009/0135142 A1 | 5/2009 | Fu et al. | |
| 2009/0167682 A1 | 7/2009 | Yamashita et al. | |
| 2009/0195372 A1 | 8/2009 | Aichi et al. | |
| 2009/0322499 A1 | 12/2009 | Pryor | |
| 2010/0052879 A1* | 3/2010 | Nanos | 340/407.2 |
| 2010/0093401 A1* | 4/2010 | Moran et al. | 455/566 |
| 2010/0177035 A1 | 7/2010 | Schowengerdt et al. | |
| 2010/0182399 A1 | 7/2010 | Choi et al. | |
| 2010/0214267 A1 | 8/2010 | Radivojevic et al. | |
| 2010/0222110 A1* | 9/2010 | Kim et al. | 455/566 |
| 2010/0315266 A1 | 12/2010 | Gunawardana et al. | |
| 2011/0018695 A1 | 1/2011 | Bells et al. | |
| 2011/0029185 A1 | 2/2011 | Aoki et al. | |
| 2011/0188176 A1* | 8/2011 | Kim | 361/679.01 |
| 2011/0306387 A1 | 12/2011 | Moon | |
| 2013/0007653 A1 | 1/2013 | Stolyarov et al. | |
| 2013/0149964 A1 | 6/2013 | Kreiner et al. | |
| 2013/0155070 A1 | 6/2013 | Luo | |
| 2013/0201155 A1 | 8/2013 | Wu et al. | |
| 2013/0278552 A1 | 10/2013 | Kamin-Lyndgaard | |
| 2014/0240267 A1 | 8/2014 | Luo | |

OTHER PUBLICATIONS

Jania, "Cypress CapSense Successive Approximation Algorithm," Cypress White Paper CSA RJO, pp. 1-6 (2007).

Onno et al., "A Natural Human Hand Model," The Visual Computer 24(1): 31-44 (2008).

Westerman, "Hand Tracking, Finger Identification, and Chordic Manipulation on a Multi-Touch Surface," dissertation submitted to the Faculty of the University of Delaware for a Ph.D. in electrical engineering, pp. xxix-xxx (1999).

Non-Final Office Action for U.S. Appl. No. 12/773,075 mailed Mar. 2, 2012.

Final Office Action for U.S. Appl. No. 12/773,075 mailed Jul. 19, 2012.

Interview Summary for U.S. Appl. No. 12/773,075 mailed Aug. 29, 2012.

Non-Final Office Action for U.S. Appl. No. 12/773,075 mailed Sep. 24, 2012.

Interview Summary for U.S. Appl. No. 12/773,075 mailed Oct. 19, 2012.

Notice of Allowance for U.S. Appl. No. 12/773,075 mailed Jan. 18, 2013.

Office Action for CN Application No. 201110113001.3 mailed Jan. 6, 2014.

International Application No. PCT/US2014/48273, International Search Report Nov. 25, 2014, 13 pages.

European Patent Application No. EP11772858.4, Extended Search Report Nov. 12, 2014, 7 pages.

China Intellectual Property Office office action for application CN201110113001 dated Sep. 5, 2014.

International Application No. PCT/US2011/036654, International Search Report and Written Opinion Sep. 1, 2011, 9 pages.

European Patent Application No. EP14155627.4, Extended Search Report Aug. 21, 2014, 7 pages.

International Application No. PCT/US2014/036679, International Search Report Sep. 25, 2014, 19 pages.

International Application No. PCT/US2014/038779, International Search Report Oct. 7, 2014, 14 pages.

International Search Report for patent application No. PCT/US2014/056625 (Dec. 30, 2014) 14 pages.

Non-Final Office Action for U.S. Appl. No. 13/770,791 mailed Mar. 13, 2015, 20 pages.

\* cited by examiner

DETACHABLE BACK MOUNTED TOUCHPAD FOR A HANDHELD COMPUTERIZED DEVICE

CROSS REFERENCE TO RELATED APPLICATIONS

This application is a continuation in part of U.S. patent application Ser. No. 12/773,075, "METHOD FOR USER INPUT FROM THE BACK PANEL OF A HANDHELD COMPUTERIZED DEVICE", inventor Tong Luo, filed May 4, 2010; application Ser. No. 12/773,075 in turn claimed the priority benefit of U.S. Provisional Application No. 61/327,102 filed Apr. 23, 2010, entitled "METHOD, GRAPHICAL USER INTERFACE, AND APPARATUS FOR USER INPUT FROM THE BACK PANEL OF A HANDHELD ELECTRONIC DEVICE", Tong Luo inventor; the contents of both of these applications are incorporated herein by reference.

BACKGROUND OF THE INVENTION

1. Field of the Invention

The invention is in the general area of touchpads and touch sensors for handheld computerized devices.

2. Description of the Related Art

Handheld computerized devices (i.e. handheld devices equipped with microprocessors and bit-mapped displays, often touch sensitive displays) such as cell phones, personal digital assistants (PDA), game devices, tablet PCs (such as iPad), etc., are playing a more and more important role in everyday life, and are becoming more and more indispensible. With the advance of technology, and improvements in the handheld computerized devices' processing power, both function, and memory space is increasing at an amazing pace. Meanwhile the size of the handheld computerized devices continues to get smaller and smaller.

To meet this challenge, the designers of handheld computerized devices typically use two approaches. One approach is to make the keyboard keys smaller and smaller, miniaturizing the keys. Additionally the keyboard keys may be given multiple functions—i.e. overloaded, and more complex function keyboard keys may be introduced as well.

The other approach is to make the display a touch sensitive display, and use touch screen keyboards, or so called "soft keys". Here a user may use a stylus pen or finger to select the soft keys through a graphical user interface. Due to the optical illusions introduced by the display screen, however, the soft keys cannot be too small, because otherwise a single finger press will activate multiple keys. As a result, the designer may have to divide the keys into different groups and hierarchies, and only display a small number of keys on the screen.

Both current approaches have some severe drawbacks: the user input area can occupy a significant portion of the front panel, and the user input process, although requiring a large amount of user attention to operate, still is very error prone.

Often a user has to use one hand to hold the handheld computerized device, and use the other hand to input data, thus occupying both hands. A user will often have to go through a long sequence of key strokes, and switch back and forth among different user interface screens, in order to complete a fairly simple input. As a result, there is a significant learning curve for a user to learn the overloaded keys, function keys, key grouping, and key hierarchies in order to operate the handheld computerized devices efficiently.

To simplify the user interface, various alternative methods employing touch sensors, touchpads, touch screens and the like (also called touch sensitive input devices and trackpads) have been proposed.

Yoon et. al., in U.S. patent application Ser. No. 12/691,892, proposed a mobile terminal having a dual touch screen and method of controlling content therein. This patent application disclosed a handheld computerized device with two built-in touch sensors, one located on the device's front touch screen, and a second touchpad sensor located on the rear of the device.

Cholewin et. al. in U.S. patent application Ser. No. 12/505,755, as well as Gorsica et. al. in U.S. patent application Ser. No. 12/492,369, proposed various types of portable handheld computerized devices with either opposing built-in touch sensitive surfaces, or alternatively constructing handheld computerized devices with the touchpad on the rear surface.

Luo, in U.S. provisional patent application 61/327,102, and U.S. non-provisional patent application Ser. No. 12/773,075, both of which are incorporated herein by reference, introduced a method that utilized a back mounted touchpad. This method took touch input data from this back mounted touchpad, and used software models of the hand to in turn generate a virtual image of the most likely user rear hand position, often superimposed upon a virtual keyboard layout. The net effect was to attempt to make the handheld computerized device "transparent", thus allowing the user to visualize the most likely position of his hands and fingers that were otherwise hidden because they were behind the device. Thus the method allowed the user to use a touchpad keypad on the back of the device to input keystrokes and mouse actions, and this touchpad data was reflected on the display screen on the front of the handheld computerized device as "virtual fingers" or equivalent.

BRIEF SUMMARY OF THE INVENTION

The invention is based, in part, on the insight that the vast majority of handheld computerized devices do not incorporate touchpads on the back side of the device, and further on the insight that due to competitive cost pressures on the handheld computerized device industry, back side mounted touchpads are not likely to become a standard feature of such handheld computerized devices.

The invention is also based, in part, on the insight that the functionality of many popular handheld computerized devices can be extended by way of various types of software, either by running various software applications programs (apps) on top of the computerized device's basic operating system, or by modifying the operating system software itself. Further, many such popular handheld computerized devices have various data input mechanisms—input ports, short range wireless transceivers (e.g. Bluetooth™ transceivers), audio input/output jacks, and the like by which peripherals may be added to the handheld computerized device, thereby extending its functionality.

The invention is also based, in part, on the insight that it would be desirable to produce a touchpad peripheral configured to reversibly attach to the back surface of a handheld computerized device. Such a detachable back mounted touchpad could, in conjunction with appropriate applications software or appropriate modifications to the underlying operating system software, function to improve the user interface of the handheld computerized device in many ways. In some embodiments, the invention's back mounted touchpad peripheral could be used to bring the dual front-and back touching user interface concepts of Yoon to a handheld computerized device that otherwise would not be capable of implementing such a user interface. In other embodiments, the invention's back mounted touchpad peripheral could be used to bring the virtual fingers concepts of Luo to handheld computerized devices not otherwise capable of implementing such a user interface, and so on.

Thus in one embodiment, the invention may be a detachable touchpad device configured to reversibly attach to the back side of a handheld computerized device. Generally this handheld computerized device, which may be a smart phone, tablet computer, and the like will comprise at least a front side with a display screen, a back side without any touch input sensing devices, at least one processor, memory, and at least operating system software, such as Apple iOS, Android, Windows, Linux, and the like.

The invention's detachable touchpad device will generally comprise a cover configured to reversibly attach to part or all of the back side of the handheld computerized device. This cover will itself have a font side configured to face the back side of the handheld computerized device, and a back side opposite the cover front side that is configured to face away from the back side of the handheld computerized device. As a result, when the cover is attached to the handheld computerized device, the cover's back side can make contact with the hand of a user who is operating the computerized device from behind. The cover will generally have at least one touch sensing pad disposed to detect rear touch input from the user. To communicate touch data from the touch sensing pad, the detachable touchpad device will further have at least one data transfer device to communicate this touch input from the touch sensing pad to the handheld computerized device microprocessor(s) (processor). Thus when the detachable touchpad device is attached to the back side of the handheld computerized device, touch input from the user can be used to control the handheld computerized device.

DETAILED DESCRIPTION OF THE INVENTION

As previously discussed, in one embodiment, the invention may be a detachable touchpad device configured to reversibly attach to the back side of a handheld computerized device.

Figure 1:
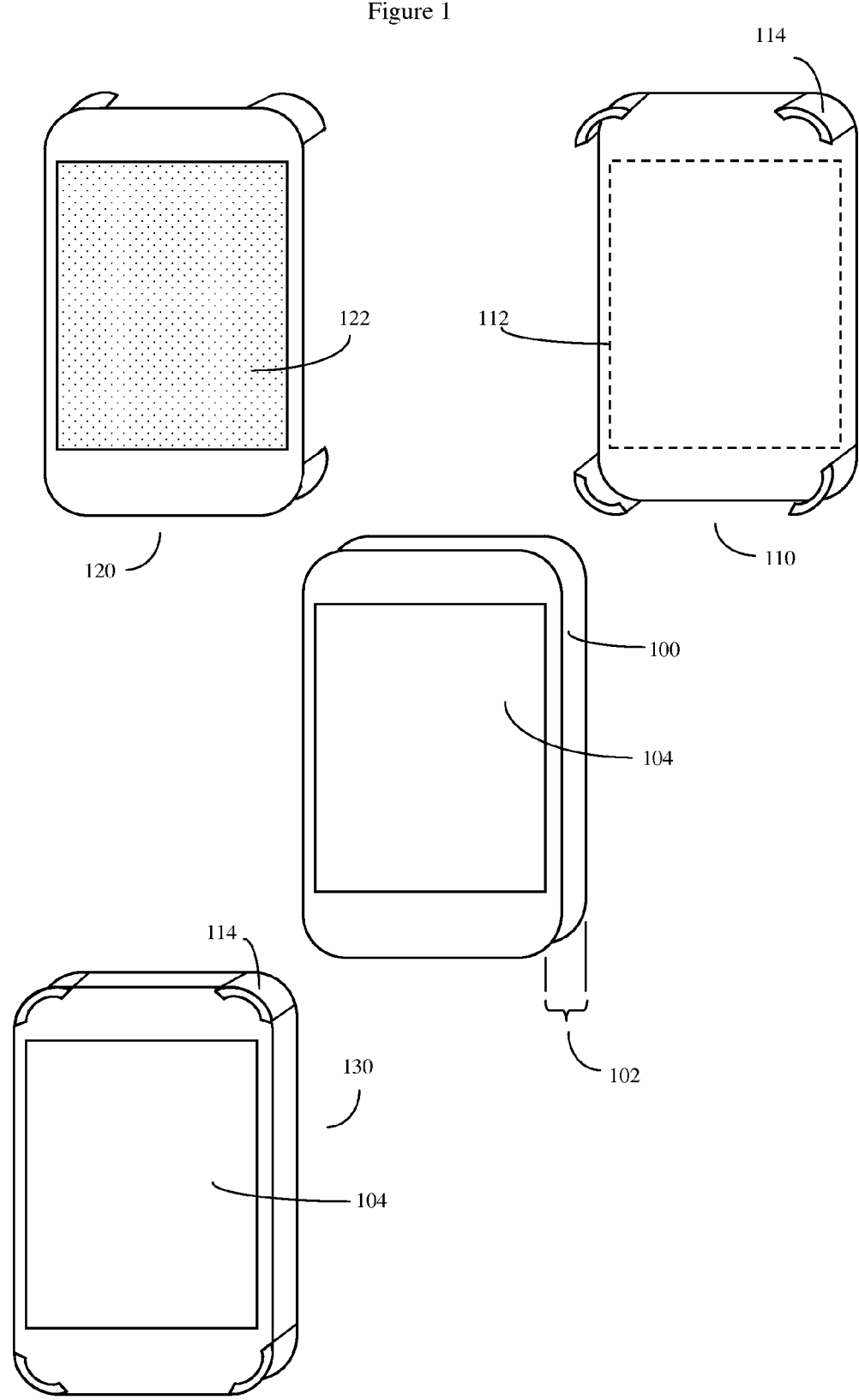
FIG. 1 shows a comparatively hard or rigid or semi-rigid body, clip-on embodiment of a detachable touchpad device with a built in touchpad on the back surface.

FIG. 1 shows a hard-body (rigid-body or semi-rigid body), clip-on embodiment of a detachable touchpad device with a built in touchpad on the back surface.

As previously discussed, generally the handheld computerized device (100) may be a smart phone, tablet computer, and the like. In these illustrations, in order to better show the depth (102) of the handheld device, a relatively thick handheld device, modeled roughly after the Apple iPhone 4 is shown, but of course other thicknesses, screen sizes, and input and output port configurations may be used.

Such handheld computerized devices generally comprise at least a front side with a display screen (104), which is often a touch sensitive display screen (touch screen). These devices also usually comprise a back side generally disposed on the side of the device opposite to the front side. Typically such backsides, which are often configured to lie on support surfaces (e.g. tables), usually do not have any touch input sensing devices. As will be discussed in more detail in FIG. 5, such handheld computerized devices generally comprise, at least one processor, memory, and at least operating system software, such as Apple iOS, Android, Windows, Linux, and the like. Usually such handheld computerized devices also comprise one or more input or input/output ports, short range wireless transceivers, and the like.

In FIG. 1, the hard (rigid or semi-rigid) body, clip-on embodiment of a detachable touchpad device with a built-in touchpad on its back surface is shown showing both the detachable touchpad device's front side (110) and back side (120). In this configuration, the hard or rigid body of this clip-on may be made from a rigid or semi-rigid but slightly deformable material, such as hard rubber (which may be synthetic rubber), plastic or metal, in order to confer enough rigidity to clip on relatively firmly once attached, yet still deform enough to enable the device to be reversibly attached or detached by the user as desired.

The detachable touchpad device (110), (120) will generally comprise a cover configured to reversibly attach to at least part or all of the back side of the handheld computerized device (in these figures, the device is covering all of the handheld computerized device's backside). This cover will itself have a font side (110) configured to face the back side of the handheld computerized device, and a back side opposite the cover front side (120) that is configured to face away from the back side of the handheld computerized device. As a result, when the cover is attached to the handheld computerized device (130), the cover's back side can make contact with the hand of a user who is operating the computerized device. The back side of the cover (120) will generally have at least one touch sensing pad (122) disposed to detect touch input from the user. The outline showing the approximate location of this touch sensing pad is also shown on the front cover (110) as (112). In this embodiment, the detachable touchpad device clips (110), (120) on to the handheld computerized device (100) by way of clips (114), thus creating a handheld computerized device with a rear mounted touchpad (130).

Figure 2:
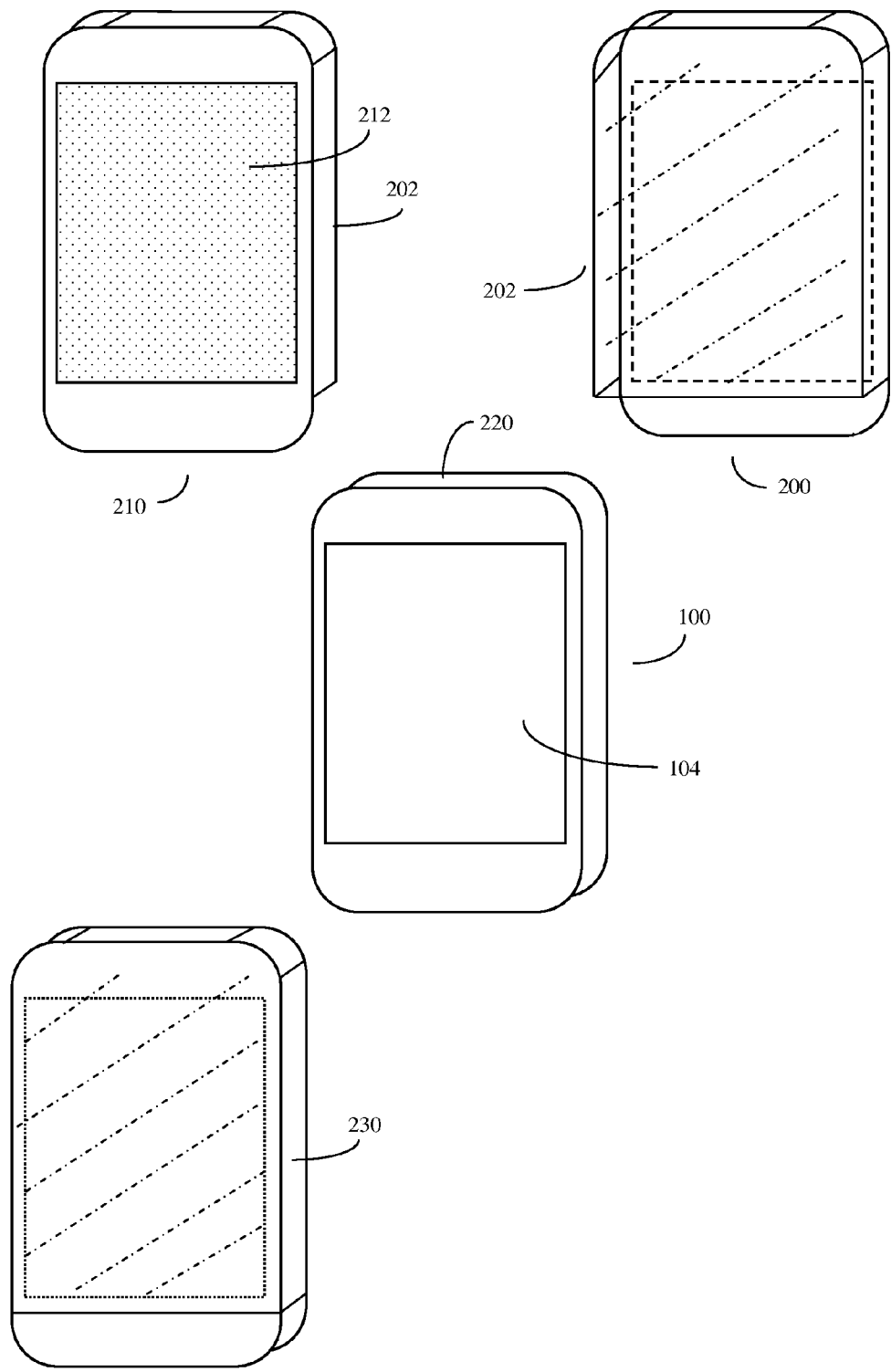
FIG. 2 shows a slip-on embodiment of a detachable touchpad device with a built-in touchpad on the back surface.

FIG. 2 shows a slip-on embodiment of a detachable touchpad device with a built-in touchpad on the back surface, again from both the front cover (200) and rear cover (210) perspective. This embodiment also shows that the detachable touchpad device does not necessarily need to be rigid. Rather, in this example, the front of the detachable device (202) may have a pouch (202) configured to slip over the top (220) of the handheld computerized device (100). Some or all of this pouch may be made from a transparent flexible material such as Mylar or other deformable transparent plastic. Thus when the detachable touchpad device is slipped onto the handheld computerized device (230), the user may still see and interact with the handheld computerized device's display screen (104), while also being able to interact with the touch sensing pad on the back side of the detachable touchpad device.

To communicate touch data from the touch sensing pad, the detachable touchpad device will further have at least one data transfer device to communicate this touch input from the touch sensing pad to the handheld computerized device microprocessor(s) (processor).

Figure 3A:
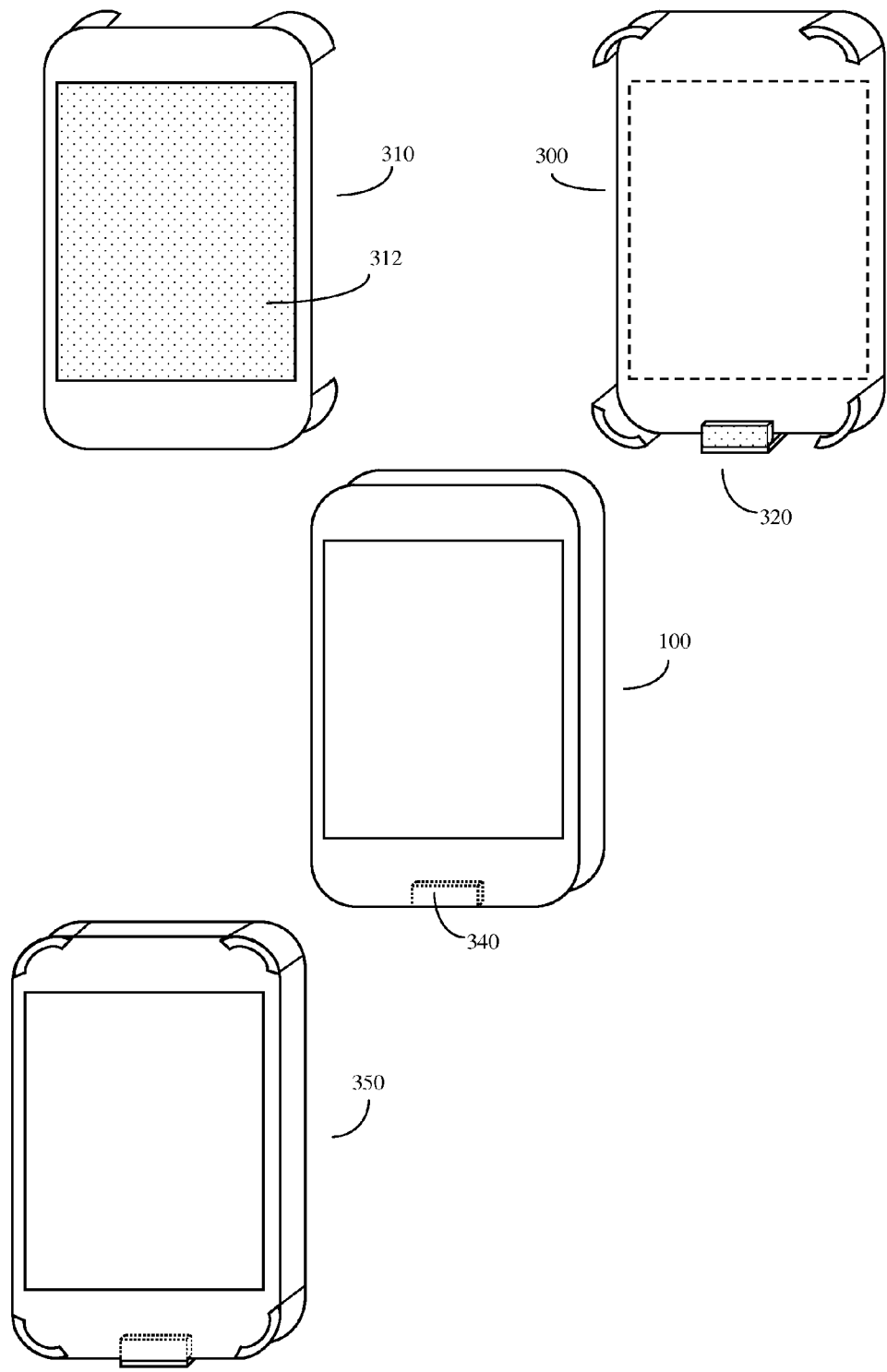
FIG. 3A shows an embodiment in which the detachable touchpad device with a built in touchpad communicates with the handheld computerized device via a fixed communications/power connector, in this example positioned at the bottom of the detachable touchpad device.

FIG. 3A shows an embodiment in which the detachable touchpad device with a built in touchpad (312) (front and back sides shown as (300) and (310)) communicates with the handheld computerized device via a fixed communications/power connector (320), in this example positioned at the bottom of the detachable touchpad device.

The communications/power connector (320) must at least be a communications connector or data input connector to enable input from the touch sensing pad to be sent to the handheld computerized device processor. Here the connector (320) may be configured so as to readily plug into a socket or complementary connector (340) on the handheld computerized device (100). The resulting configuration where the detachable touchpad device (300) is attached to the handheld computerized device (100) is shown in (350).

In some embodiments, this connector (320) may also borrow electrical power from the handheld computerized device to operate the detachable touchpad device. In other embodiments, for example if the detachable touchpad device is configured with its own battery, then the connector (320) may optionally be used to charge the handheld computerized device (100).

Figure 3B:
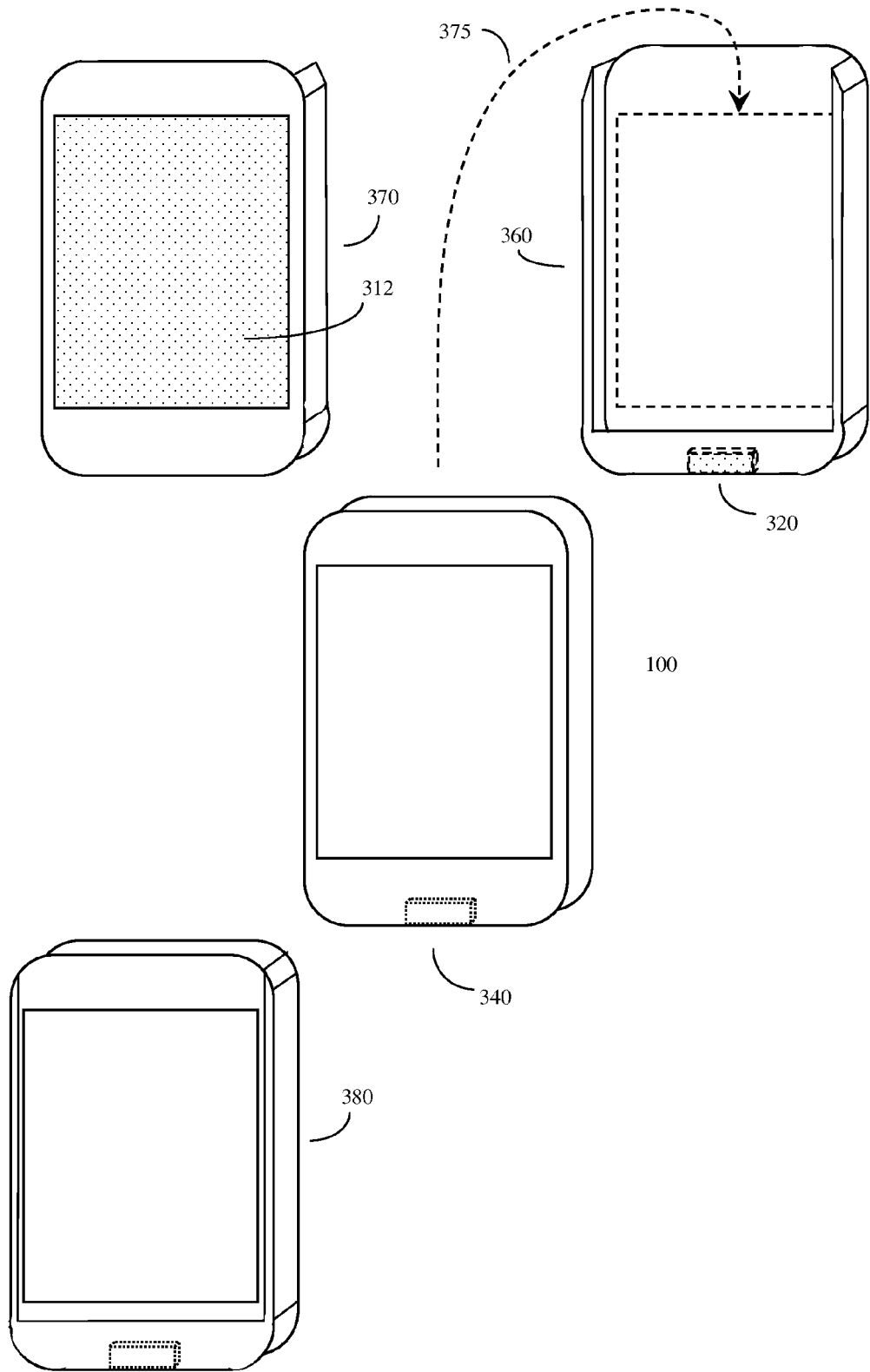
FIG. 3B shows a variant on the device previously shown in FIG. 3A, in which the cell phone slips down into the detachable touchpad device from above.

FIG. 3B shows an alternate top-slip on embodiment in which the detachable touchpad device with a built in touchpad (312) (front and back sides shown as (360) and (370)) slips into the device from the top (375), and then again communicates with the handheld computerized device via a fixed communications/power connector (320), in this example positioned at the bottom of the detachable touchpad device.

As before, the communications/power connector (320) must at least be a communications connector or data input connector to enable input from the touch sensing pad to be sent to the handheld computerized device processor. Here again the connector (320) may be configured so as to readily plug into a socket or complementary connector (340) on the handheld computerized device (100). The resulting configuration where the detachable touchpad device (360/370) is attached to the handheld computerized device (100) is shown in (380).

As before in some embodiments, this connector (320) may again borrow electrical power from the handheld computerized device to operate the detachable touchpad device. In other embodiments, for example if the detachable touchpad device is configured with its own battery, then the connector (320) may optionally be used to charge the handheld computerized device (100).

Figure 4:
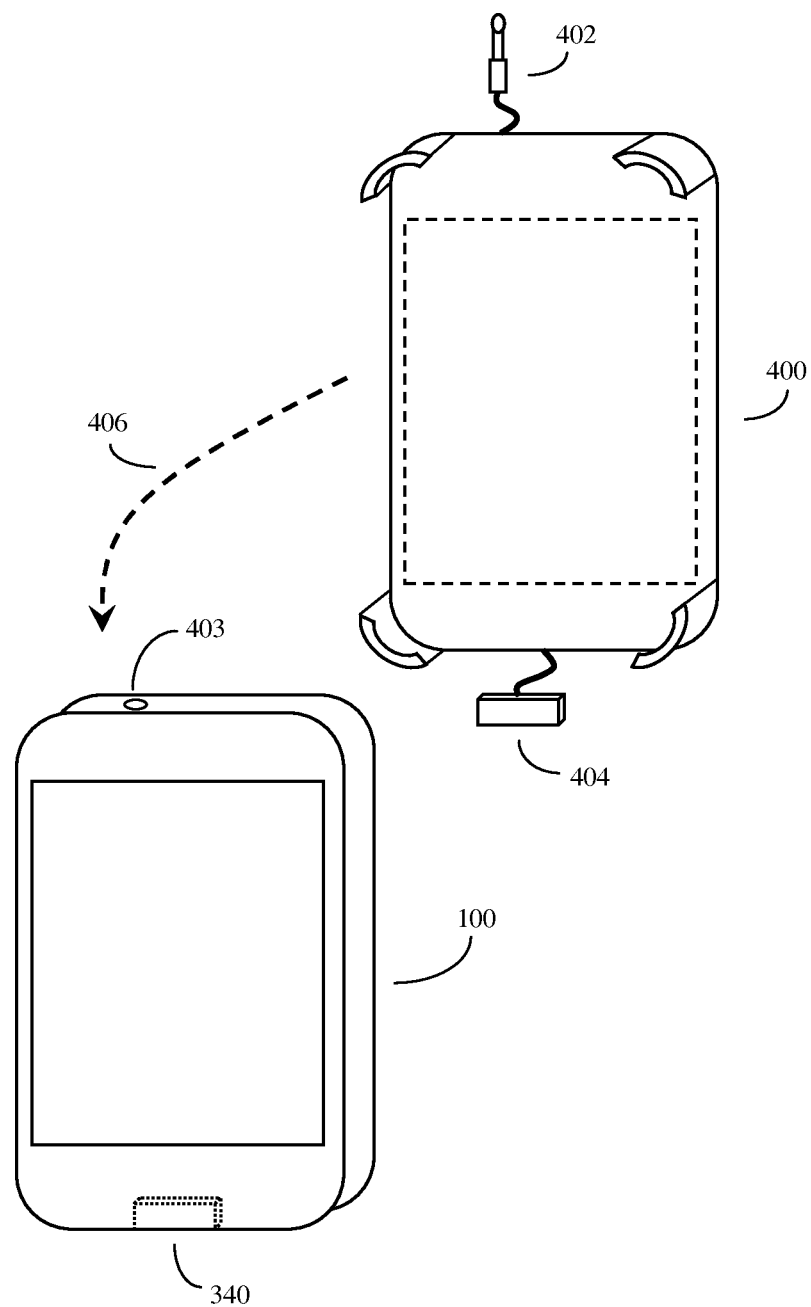
FIG. 4 shows examples of various alternative direct electrical cables, electrical connectors, and wireless links that can be used to communicate touch input from the built-in touchpad on the back surface of the detachable touchpad device, to the handheld computerized device.

FIG. 4 shows examples of various alternative embodiments of the detachable touchpad device invention (400), where other types of direct electrical cables, electrical connectors, and wireless links can be used to communicate touch input from the built-in touchpad on the back surface of the detachable touchpad device to the handheld computerized device. In one alternative embodiment, the detachable touchpad device may connect to the handheld computerized device (100) via an audio port connection (402) (403) and a direct wire connection. In another alternative embodiment, the detachable touchpad device may connect to the handheld computerized device via a data port connection (404), (340) and an alternative direct wire connection. In yet another alternative embodiment, the detachable touchpad device (400) may transmit touch information data to the handheld computerized device (100) via a short-range wireless link such as a Bluetooth link (406).

Figure 5:
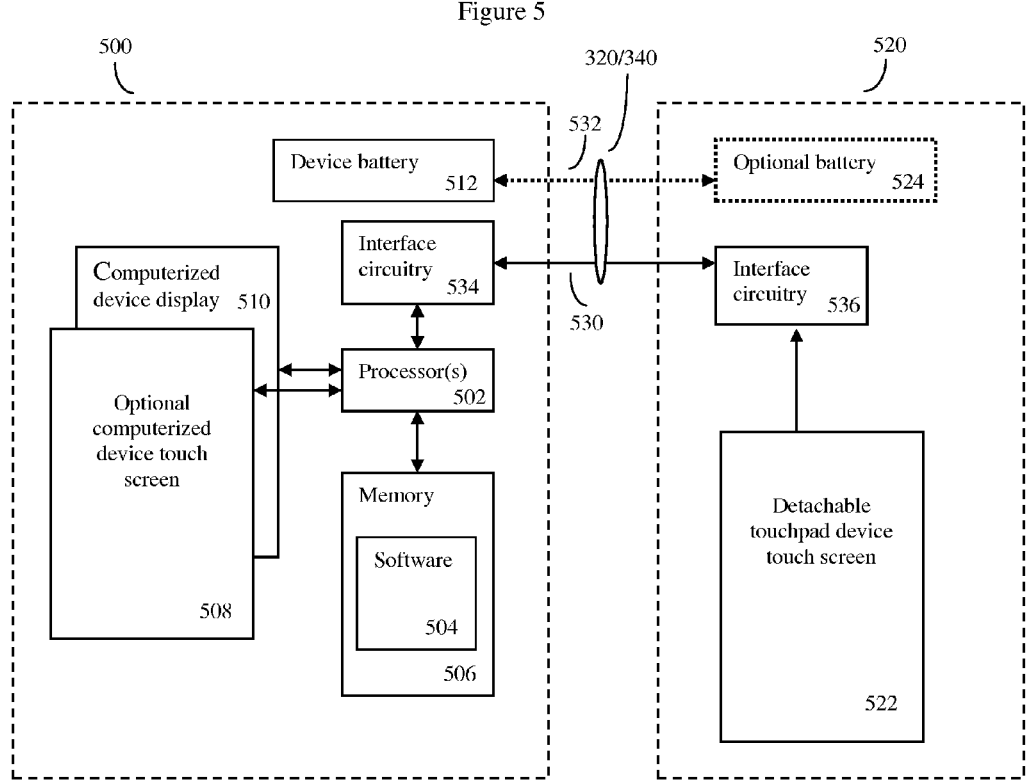
FIG. 5 shows an example of how one or more microprocessors onboard the handheld computerized device may accept data from the detachable touchpad device's built-in touchpad on the back surface, and with the appropriate software, and in some embodiments in conjunction with touch data from the handheld computerized device's own front-mounted touch screen, control the operation and display of the handheld computerized device.

FIG. 5 shows a simple electrical diagram of a handheld computerized device (500) connecting to the invention's detachable touchpad device (520). Here the connection shown is by a combination communications power port, connector, or socket, such as the connector/socket arrangement (320)/340 previously shown in FIG. 3A. The data communications link is shown as (530), and the optional power link is shown as (532). The data communications links will usually be facilitated by appropriate data communications interface circuitry (534), (536) on both sides of the link. This interface circuitry will vary according to the type of data transfer mechanism desired, and may be wireless circuitry (e.g. Bluetooth), or data port circuitry according to various protocols (e.g. USB, RS232, FireWire, etc.).

Here one or more microprocessors (502) onboard the handheld computerized device (500) may accept data from the detachable touchpad device's built-in touchpad on the back surface (522) and with the appropriate software (504) (either application software and/or operating system software) residing in memory (506), and in some embodiments in conjunction with touch data from the handheld computerized device's own touch screen (508), control the operation and display (510) of the handheld computerized device.

In some embodiments, such as when wireless data communications is desired, or when the manufacturer and user wishes to take advantage of the ability of the detachable touchpad device to carry a supplemental battery to provide supplemental power to the handheld computerized device, the detachable touchpad device may additionally comprise at least one additional battery (524) that in some embodiments may either draw from and/or supply power to the handheld device's battery (512).

Thus when the detachable touchpad device is attached to the back side of the handheld computerized device, touch input from the user can be used to control the handheld computerized device.

In a preferred embodiment, the detachable touchpad device's touch sensing pad will act to create or comprise a multi-touch sensing surface capable of recognizing the presence and locations of at least two points of contact with the touchpad or touch sensor surface. Thus when the detachable touchpad device transmits the presence and locations to of these various points of contacts via the data transfer device/ interface to the handheld computerized device, software (504) can interpret this multi-touch data and use it to control the handheld computerized device.

Figure 6:
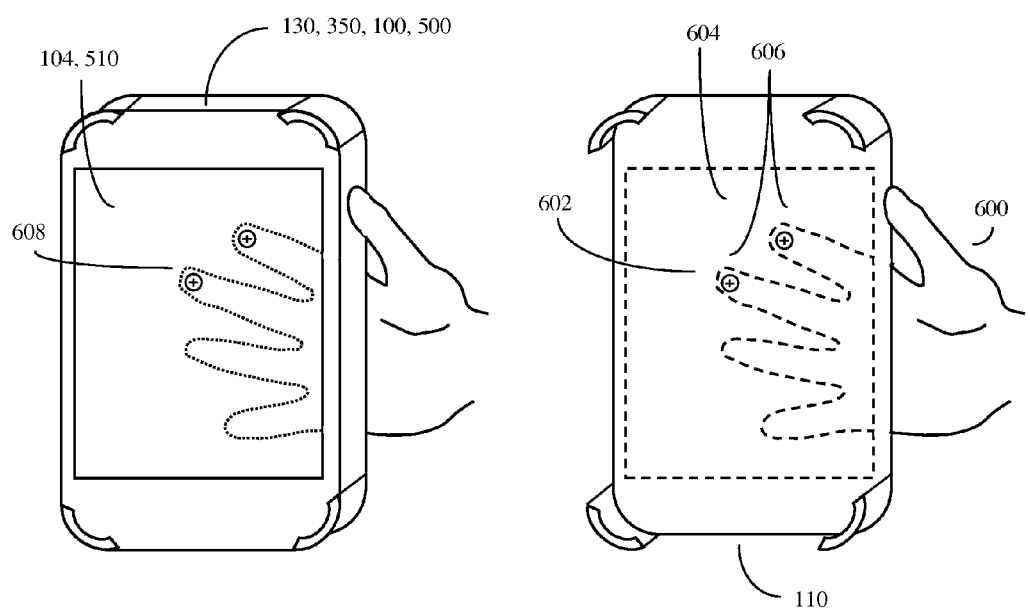
FIG. 6 shows the user's hand and fingers touching the built-in touchpad on the back surface of the detachable touchpad device, and how in the preferred multi-touch embodiment, the back touchpad will recognize the position and locations of at least two points of contact between the user's fingers and the back touchpad, and transmit this data to the handheld computerized device. In this example, software onboard the handheld computerized device may additionally be generating a representation of the approximate locations of the user's fingers and hand on the computerized devices' display screen.

FIG. 6 shows the user's hand (600) and fingers (602) touching the built-in touchpad on the back surface of the detachable touchpad device (604), and how in the preferred multi touch embodiment, the back touchpad (604) will recognize the position and locations of at least two points of contact between the user's fingers and the back touchpad (606), and transmit this data to the handheld computerized device (130, 350, 100, 500). In this example, software (504) onboard the handheld computerized device (130), (500) may additionally be generating a representation of the approximate locations of the user's fingers (608) on the computerized devices' display screen (104), (510) Here, software techniques and methods such as those taught by Luo in U.S. patent application Ser. No. 12/773,075 and U.S. provisional application 61/327,102, both incorporated herein by reference, may be used.

Hardware:

The touchpad or touch sensors used for this detachable touchpad device can include a variety of different type of touch sensing technologies, such as multi-touch capacitive technology, touch resistive technology, multi-touch optical technologies, or even more exotic touch sensing devices such as touch wave technologies or force based sensing or near field imaging technologies.

Examples of suitable multi-touch capacitive technology include surface capacitive, projected capacitive touch, or in-cell capacitive technologies. Examples of touch resistive technology include analog resistive or digital resistive or in-cell resistive technologies. Example of multi-touch optical technologies include optical or infrared imaging technology, rear diffused illumination, infrared grid technology, digital waveguide touch, or infrared optical waveguide technologies, as well as Kinect or in-cell optical technologies. Examples of touch wave technology include surface acoustic wave or bending wave touch technology.

The invention claimed is:

1. A detachable touchpad device having an opening adapted to reversibly receive a non-transparent handheld computerized device, said detachable touchpad device comprising:

a rigid non-foldable cover including a front side adapted to form a contact with a back side of said non-transparent handheld computerized device when said non-transparent handheld computerized device is inserted in said detachable touchpad device via said opening;

at least one touch sensing pad disposed on a back side of said rigid non-foldable cover of said detachable touchpad device, said touch sensing pad adapted to detect a touch input from a user when said user holds said detachable touchpad device thereby enabling the user to control said non-transparent handheld computerized device using said detachable touchpad device, wherein said touchpad is free from mechanically actuated keys; and a data transfer device in said detachable touchpad device comprising interface circuitry adapted to transfer data representative of said touch input from said detachable touchpad device to at least one processor of said non-transparent handheld computerized device, said processor being adapted to detect and interpret said touch input to control said non-transparent handheld computerized device when said data is transferred.

2. The detachable touchpad device of claim 1, wherein said rigid non-foldable cover reversibly attaches to part or all of said back side of said non-transparent handheld computerized device, and said cover does not cover a device display screen of said non-ransparent handheld computerized device.

3. The detachable touchpad device of claim 1, wherein said rigid non-foldable cover reversibly attaches to part or all of said back side of said non-transparent handheld computerized device, and said cover also covers a portion of said device display screen.

4. The detachable touchpad device of claim 1, wherein a shape of said rigid non-foldable cover front side substantially conforms to at least a shape of said back side of said non-transparent handheld computerized device.

5. The detachable touchpad device of claim 4, wherein said rigid non-foldable cover reversibly attaches to said non-transparent handheld computerized device by snapping into a position in which a complementary fit between the shape of raised or lowered surfaces on said back side of said non-transparent handheld computerized device and the shape of raised or lowered features on said rigid non-foldable cover front side acts to attach said detachable touchpad device to said non-transparent handheld computerized device.

6. The detachable touchpad device of claim 1, in which said data transfer device communicates said touch input to said non-transparent handheld computerized device via an electrical cable and/or direct electrical connector.

7. The detachable touchpad device of claim 1, in which said data transfer device communicates said touch input to said non-transparent handheld computerized device via a wireless link.

8. detachable touchpad device of claim 1, in which said touch sensing pad comprises a multi-touch sensing surface capable of recognizing the presence and locations of at least two points of contact with said multi-touch sensing surface, and transmitting said presence and locations to said data transfer device.

9. The detachable touchpad device of claim 1, wherein an operating system software or software applications running under said operating system software on said non-transparent handheld computerized device uses said touch input to generate images on a device display screen of said non-transparent handheld computerized device, the images portraying the approximate position of at least some of said user's finger positions and finger movement.

10. The detachable touchpad device of claim 1, wherein a device display screen on said non-transparent handheld computerized device is a touch sensitive device display screen, and in which said non-transparent handheld computerized device is controlled by touch input from both said touch sensitive device display screen and touch input from said detachable touchpad device.

11. The detachable touchpad device of claim 1, wherein said non-transparent handheld computerized device additionally comprises a touchpad device battery, and in which said touchpad device battery is configured to either draw power from said handheld device battery and/or provide power to said handheld device battery.

12. A detachable touchpad device having an opening adapted to reversibly receive a non-transparent handheld computerized device, said detachable touchpad device comprising:

a rigid non-foldable cover including a front side adapted to form a contact with a back side of said non-transparent handheld computerized device when said non-transparent handheld computerized device is inserted in said detachable touchpad device via said opening;

at least one touch sensing pad disposed on a back side of said rigid non-foldable cover of said detachable touchpad device, said touch sensing pad adapted to detect a touch input from a user when said user holds said detachable touchpad device thereby enabling the user to control said non-transparent handheld computerized device using said detachable touchpad device, wherein said touchpad is free from mechanically actuated keys; and a data transfer device in said detachable touchpad device comprising interface circuitry adapted to transfer data representative of said touch input from said detachable touchpad device to at least one processor of said non-transparent handheld computerized device, said processor being adapted to detect and interpret said touch input to control said non-transparent handheld computerized device when said data is transferred.

13. The detachable touchpad device of claim 12, wherein said rigid non-foldable cover reversibly attaches to said non-transparent handheld computerized device by snapping into a position in which a complementary fit between the shape of raised or lowered surfaces on said backside of said non-transparent handheld computerized device and the shape of raised or lowered features on said rigid non-foldable cover front side acts to attach said detachable touchpad device to said non-transparent handheld computerized device.

14. The detachable touchpad device of claim 12, wherein said rigid non-foldable cover reversibly attaches to part or all of said back side of said non-transparent handheld computerized device, and said cover does not cover a device display screen of said non-ransparent handheld computerized device.

15. A method of operating a non-transparent handheld computerized device, said method comprising:

providing a detachable touchpad device having an opening adapted to reversibly receive the non-transparent handheld computerized device, said detachable touchpad device comprising:

a rigid non-foldable cover including a front side adapted to form a contact with a back side of said non-transparent handheld computerized device when said non-transparent handheld computerized device is inserted in said detachable touchpad device via said opening;

at least one touch sensing pad disposed on a back side of said rigid non-foldable cover of said detachable touchpad device, said touch sensing pad adapted to detect a touch input from a user when said user holds said detachable touchpad device thereby enabling the user to control said non-transparent handheld computerized device using said detachable touchpad device, wherein said touchpad is free from mechanically actuated keys; and a data transfer device in said detachable touchpad device comprising interface circuitry adapted to transfer data representative of said touch input from said detachable touchpad device to at least one processor of said non-transparent handheld computerized device, said processor being adapted to detect and interpret said touch input to control said non-transparent handheld computerized device when said data is transferred.

16. The method of claim 15, wherein a device display screen of said non-transparent handheld computerized device is a touch sensitive device display screen, and further using touch input from both said touch sensitive device display screen and touch input from said detachable touchpad device to control said non-transparent handheld computerized device.

17. The method of claim 15, wherein said rigid non-foldable cover reversibly attaches to said non-transparent handheld computerized device by snapping into a position in which a complementary fit between the shape of raised or lowered surfaces on said back side of said non-transparent handheld computerized device and the shape of raised or lowered features on said rigid non-foldable cover front side acts to attach said detachable cover touchpad device to said non-transparent handheld computerized device.

\* \* \* \* \*